H. JOHNSTON.
Stalk-Chopper.
No. 23,644.  
Patented Apr. 12, 1859.
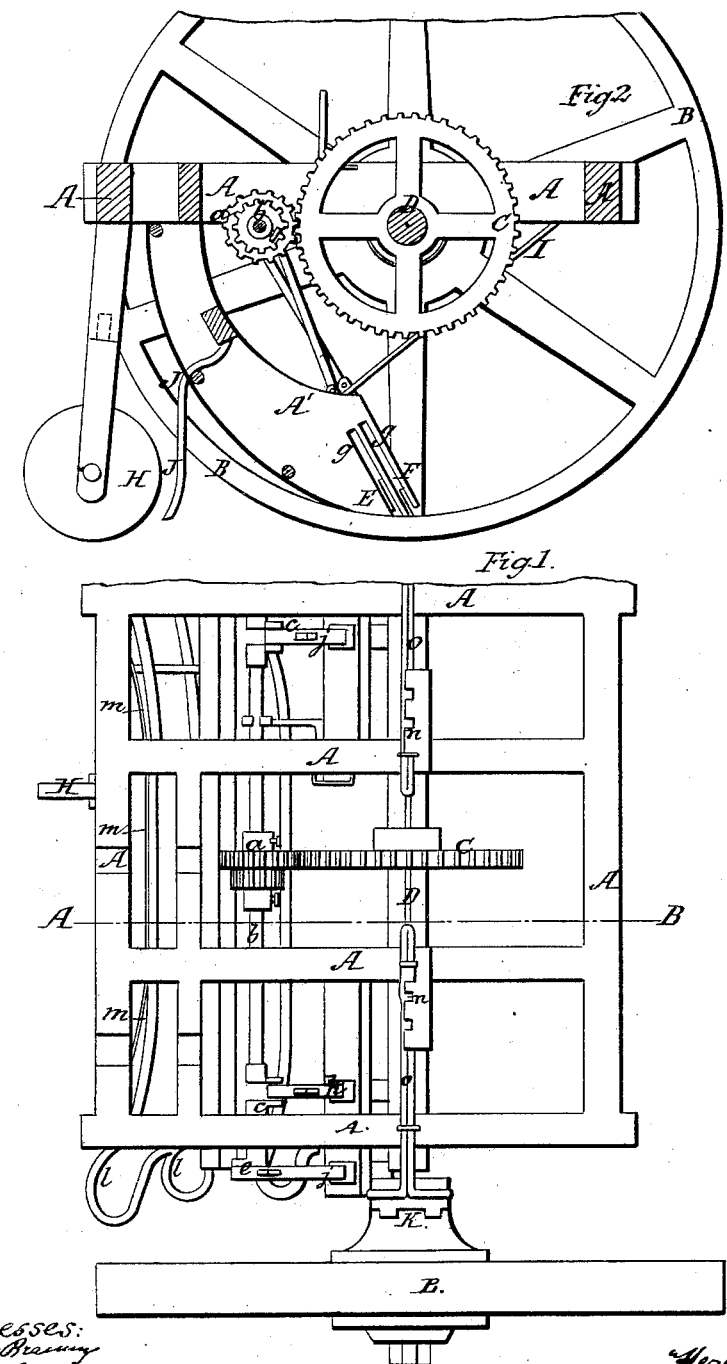

UNITED STATES PATENT OFFICE.

HEZEKIAH JOHNSTON, OF COLINSVILLE, ILLINOIS, ASSIGNOR TO HIMSELF AND RICHARD WITHERS, OF SAME PLACE.

IMPROVEMENT IN MACHINES FOR CUTTING CORNSTALKS, &c., ON GROUND PREPARATORY TO PLOWING.

Specification forming part of Letters Patent No. 23,644, dated April 12, 1859.

*To all whom it may concern:*

Be it known that I, HEZEKIAH JOHNSTON, of Colinsville, in Madison county, and State of Illinois, have invented a new and useful Machine for Cutting Cornstalks; and I do hereby declare that the following is a full, clear, and exact description of the same, reference being had to the annexed drawings, making part of this specification, in which—

Figure 1 is a plan, and Fig. 2 a transverse section through A' B'.

It is frequently the case that after corn has ripened the farmer goes into the field and plucks the ears of corn from the stalks, and gathers them in the barn or husks them on the field, as the case may be, and leaves the stalks standing upon the field to be trodden down by the cattle, and afterwards plowed under; but as the stalks are often of considerable length, and as they do not rot in one season, it is very difficult to plow them under or work them under the ground in any way; but if these stalks were broken down upon the ground and cut up into short lengths the farmer could plow them under and make them manure the ground the first year following the crop of corn. Now, to effect this object is the design of my invention, which will be understood from the following description.

Similar letters of reference represent corresponding parts in the different figures of the accompanying drawings.

A A is the main frame of the machine, upon which and to which its various parts are secured.

B is the truck-wheels, upon which the frame is mounted, and by which it is transported and operated.

$c$ is a spur-wheel fixed upon the main shaft or axle D. This wheel meshes into a corresponding pinion-wheel, $a$, which is fixed upon a crank-shaft, $b$. This crank-shaft has four cranks upon it, $c\ d\ e\ f$.

E F are two long horizontal knives, both of which have a diagonal reciprocating motion in the guides $g\ g$. One of these knives is connected to the cranks $c\ d$, and the other is connected to the cranks $e\ f$ by means of connecting-rods $h\ i\ j\ k$. The guides $g\ g$ are made into the frame A', which reaches down to the ground, and which is made in the form of a curve, as shown, Fig. 2. The object of making this frame in manner and form as aforesaid is to cause it to break down the stalks upon the ground, so that the knives can operate upon them, and also to guide the knives, as aforesaid. The front face of this frame is covered with sheet metal or other suitable material, and is curved in the longitudinal direction, the object of which is to draw the stalks under the machine, and to further this object this curve may be continued or extended by means of projections $l\ l$ being placed in the side of the frame, as shown, the curved line being shown at $m\ m$. The curved frame A' is braced from the main frame by means of braces, as shown at I.

J J are guides introduced through the face of the curved frame A', to which they are also secured. The object of these guides is to straighten the stalks or weeds out on a line parallel to that in which the machine is moving, so that the knives will strike them on a line vertical to the one in which they lie.

K K are clutches, which work upon a square place made upon the main axle. These clutches take hold of a corresponding clutch fixed to the hub of the main wheel, by which the motion is communicated from the truck-wheels to the machine. The clutches are thrown in and out of gear by means of a lever, $n$, to which it is connected by means of a rod, $o$.

H is a caster-wheel, which supports the front of the machine, and which also facilitates its turning. It will be seen from what has been already said that there are three principal objects sought after in this invention, the first of which is to break down the stalks upon the ground. This object is effected by means of the curved frame A'. The second object is to straighten out the stalks, so that the knives can operate upon them in the manner described; and the third object is to cut them up into short ends, say about one foot long. This object is effected by the knives, which are operated by the cranks, as set forth.

The stalks may be cut in large or short pieces by changing the velocity of the knives, which may be done by altering the relative size of the spur and pinion wheel.

What I claim as my invention, and desire to secure by Letters Patent, is—

The arranging and combining the curved frame A' with the knives E E and the guides J J, in the manner described, for the purpose specified.

HEZEKIAH JOHNSTON.

Witnesses:
AMOS BROADNAX,
CLARENCE DELAFIELD.